March 22, 1960     M. MERCHANT     2,929,643
RETRACTIBLE TRAILER HITCH
Filed Nov. 26, 1958     2 Sheets-Sheet 1
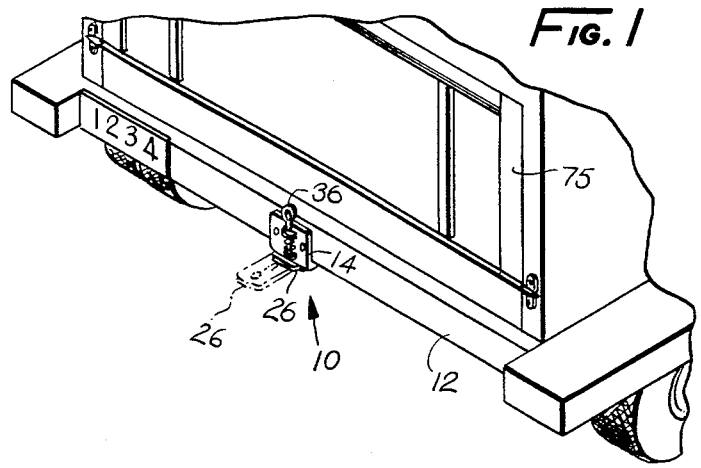
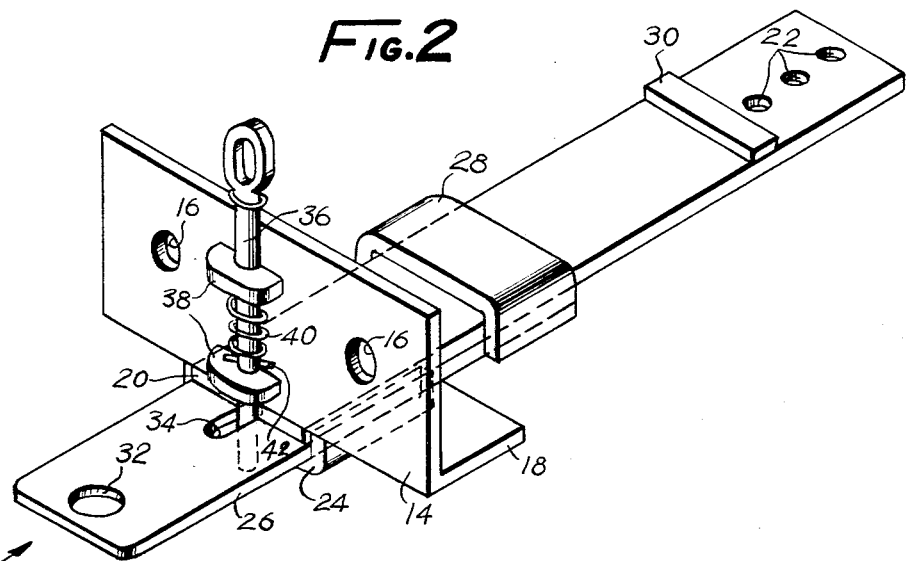
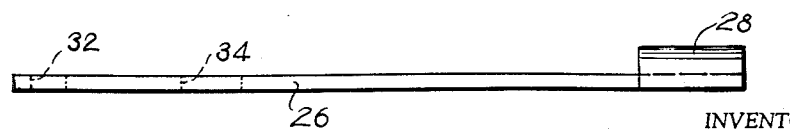
INVENTOR.
MARVIN MERCHANT
BY
Joseph B. Lindecker
ATT'Y March 22, 1960

M. MERCHANT 2,929,643

RETRACTIBLE TRAILER HITCH

Filed Nov. 26, 1958

INVENTOR.
MARVIN MERCHANT
BY
Joseph B. Lindecker.
ATT'Y.

United States Patent Office 2,929,643
Patented Mar. 22, 1960

2,929,643

RETRACTIBLE TRAILER HITCH

Marvin Merchant, Jackson, Nebr.

Application November 26, 1958, Serial No. 776,489

1 Claim. (Cl. 280—491)

This invention relates to trailers and more particularly to a trailer hitch for pickup trucks and cars.

It is an object of the present invention to provide a retractible trailer hitch that may be conveniently secured to the rear end of the underframe of a pickup truck in such a way that it will not interfere with the operation of the tail gate thereof.

Another object of the present invention is to provide a trailer hitch which is retracted when not in use so as to present a neat and attractive appearance and prevent injury from projecting parts.

Still an additional object of the present invention is to provide a retractible trailer hitch of the above type having self contained detent means for selectively securing the draw bar thereof in an extended or retracted position.

Other objects of the invention are to provide a retractible trailer hitch bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a fragmentary perspective view of the rear end of a pickup truck embodying a retractible trailer hitch made in accordance with the present invention;

Figure 2 is a perspective view of certain operating parts of the trailer hitch shown in Figure 1;

Figure 3 is a side elevational view of a draw bar slide forming a part of the assembly shown in Figure 2;

Figure 4:
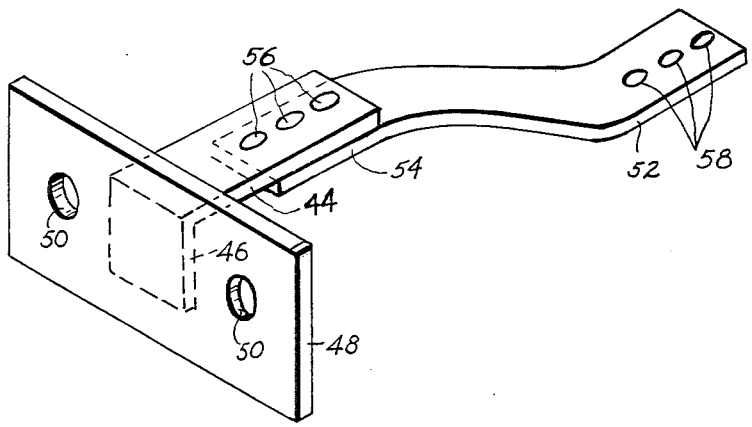
Figure 4 is a perspective view of a brace bar assembly forming another part of the present invention.

Referring now more in detail to the drawing, and more particularly to Figures 1 to 3 thereof, a retractible trailer hitch assembly 10 made in accordance with the present invention is shown to include a main mounting plate 14 having central openings 16 for receiving bolts therethrough for securing this angle shaped plate to the rear end of the underframe 12 of the vehicle. The lower web 18 of this angle mounting plate is welded to one end of a base member 20 that has mounting holes 22 at the opposite end for further attachment to the vehicle underframe.

The end of the base member 20 adjacent to the angle mounting plate 14 is provided with an integral U-shaped bail member 24 that slidably supports a retractible draw bar 26 which, in turn, has a similar inverted U-shaped bale 28 secured to its inner end that slidably receives the central portion of the base member 20. Said U-shaped bail having vertical end portions in alignment with the vertical end portions of said inverted U-shaped bail, said end portions having adjacent edges which abut each other when in use pulling a trailer. A lug 30 secured to the upper surface of the inner end of the base member 20 serves as a stop for abutment with the bail 28 to limit the inward movement of the draw bar 26.

The opposite outer end of the draw bar 26 has a circular opening 32 for receiving the lock pin of the trailer and an inwardly disposed elongated oval shaped slot 34 that slidably receives the lower end of a retractible lock pin 36 therethrough. This lock pin is slidably supported upon bearings 38 for reciprocating vertical movement relative to the mounting plate 14, while the spring 40 encircling the mid portion of this pin 36 normally urges it toward an engaged position with the draw bar 26. A cross pin 42 carried by the lower end of the pin 36 limits the downward movement of the pin 36, as is clearly shown in Figure 2.

Figure 5:
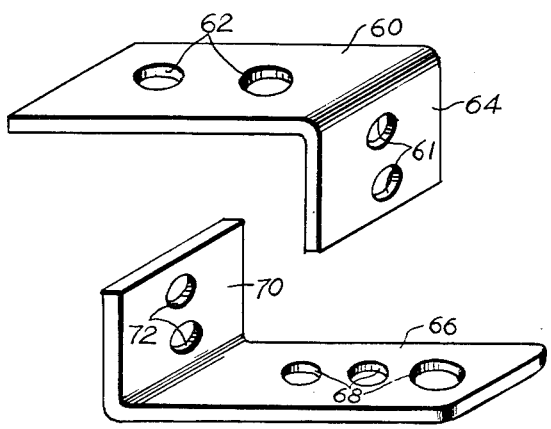
Figure 5 is a perspective view of additional fastening elements forming other parts of the present invention.

In actual use, the base member 20 is secured to the underframe 12 of the vehicle by means of the mounting holes 22 so as to enable the slide bar 26 to be selectively moved between an extended and retracted position in response to manipulation of the lock pin 36. In the completely retracted position, the lock pin 36 will be received within the hitch pin hole 32, while in the extended position, it will be received within the elongated slot 34 as shown in Figure 2. To facilitate the mounting of this assembly upon various types of vehicles, adidtional mounting brackets are provided, as shown in Figures 4 and 5. An L-shaped bar 44 having a base leg 46 integrally secured to an auxiliary mounting 48 is connected by means of bolts 56 at the opposite end to one segment 54 of an angle bar 52 having mounting holes 58 for attachment to a vehicle part. The auxiliary mounting plate 48 is provided with bolt receiving openings 50 which are lined with the bolt receiving openings 16 of the main mounting plate 14 so as to provide additional brace means for rigidifying the trailer hitch assembly. Still other adapter plates are provided in the form of an angle plate 60 having a base web 64 with bolt receiving openings 61 and another leg with similar bolt receiving opening 62. This member may be used in cooperation with another similar L-shaped bracket 66 having mounting holes 68 which cooperate with similar mounting holes 72 in the base 70 for enabling the trailer hitch assembly to be connected to still other types of vehicles.

It will now be appreciated that this device is readily applied to small trucks, automobiles, and the like in a simple and efficient manner, through the use of the basic trailer hitch assembly or through the further use of the adapter plates illustrated in Figures 4 and 5. It can be made of any desired material and design to be used with heavy and light trailers, as the case may be. In any event, when mounted upon a pickup truck, the retractible feature thereof enables the tail gate 75 to be rotated to a completely open position without interference, and such is one of the main features of the present construction.

While various changes may be made in the detail construction, it shall be understood that such changes shall be within the spirit and scope of the present invention as defined by the appended claim.

What I claim as new and desire to protect by Letters Patent of the United States is:

A retractible trailer hitch for attachment to a vehicle comprising, in combination, a base member, an angle mounting plate having its horizontal portion integrally secured transversely to the top surface of and at the outer end of said base member for securing said base member to the vehicle underframe, a U-shaped bail member integrally secured to the side edge portions of said outer end of said base member and below said angle mounting plate, an elongated flat draw bar member, said draw bar member being of the same width as that of said base member and assembled below said base member, said draw bar member having a lock pin receiving opening in the outer end thereof and an inverted U-shaped bail member integrally secured to the side edge portion at the inner end thereof, said U-shaped bail member on the outer end of said base member slidably receiving the intermediate portion of said draw bar member, said inverted U-shaped bail member on the inner end of said draw bar member slidably receiving the intermediate portion of said base member, the outer vertical end edge portions of said inverted U-shaped bail member and the inner vertical edge portions of said U-shaped bail member being in vertical alignment so that they abut each other when said draw bar member is in an outwardly extended position while drawing a trailer, an elongated slot intermediate the opposite ends of said draw bar member, a locking pin slidably supported by an upper and lower bearing upon the outer vertical surface portion of said angle mounting plate for reciprocating movement in a direction normal to the plane of said draw bar member for selective engagement with said lock pin receiving opening and said elongated slot of said draw bar member in response to longitudinal adjustment of said draw bar member between said extended and retracted positions, a coil spring sleeving said locking pin and having its lower end in engagement with a rod extending transversely through said locking pin intermediate its ends, said spring acting between said upper bearing and said rod normally urging said locking pin toward locking engagement with said draw bar member for extending through the opening and the slot therein as selected, whereby said base member and said draw bar member are telescopically slidably connected together for reciprocation longitudinal relative movement and their bail members abutting each other while drawing a trailer and absorbing the thrust exposed thereon.

References Cited in the file of this patent

UNITED STATES PATENTS

| | | |
|---|---|---|
| 1,436,595 | McKay | Nov. 21, 1922 |
| 2,412,672 | Calhoun | Dec. 17, 1946 |
| 2,512,836 | Olson et al. | June 27, 1950 |
| 2,753,193 | Halverson | July 3, 1956 |
| 2,856,204 | Graham | Oct. 14, 1958 |
| 2,873,982 | Graham | Feb. 17, 1959 |